Jan. 18, 1949.  L. D. SELLARS  2,459,244
SQUARE LAWN SPRINKLER
Filed Oct. 30, 1946  2 Sheets-Sheet 1
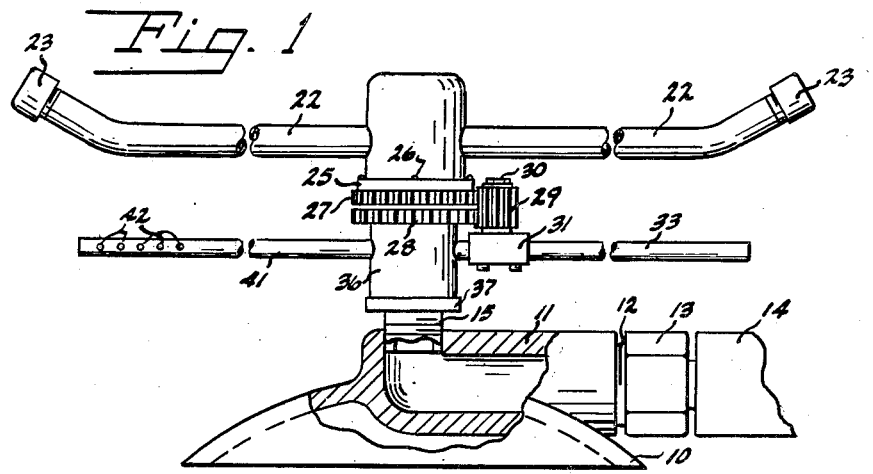
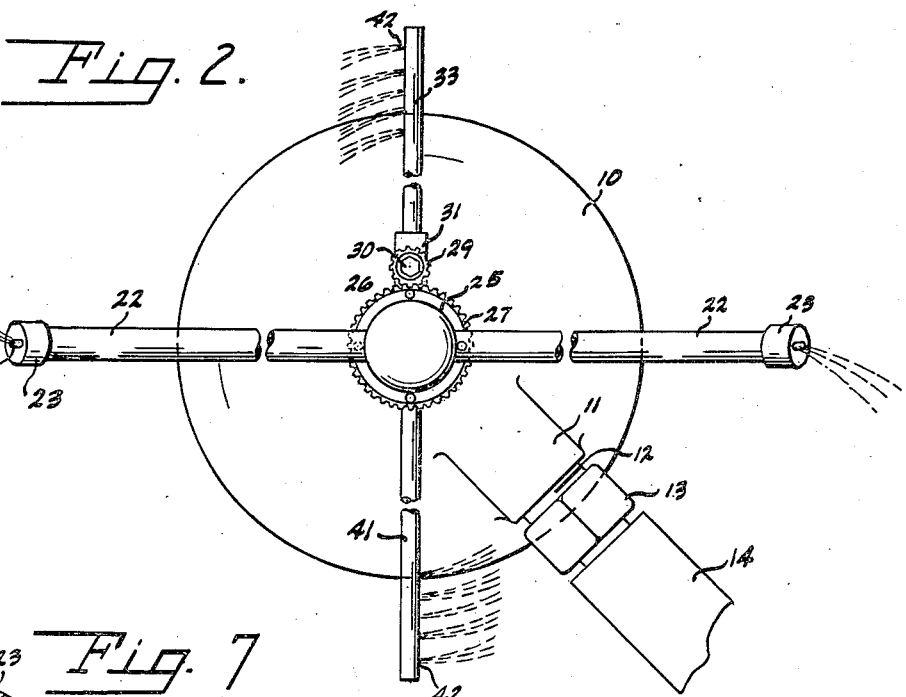
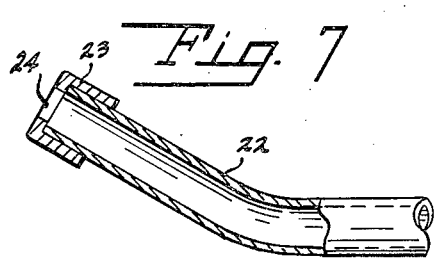
INVENTOR.
Leonard D. Sellars
BY Victor J. Evans & Co.
ATTORNEYS Jan. 18, 1949.                L. D. SELLARS                2,459,244
                            SQUARE LAWN SPRINKLER
Filed Oct. 30, 1946                                    2 Sheets—Sheet 2
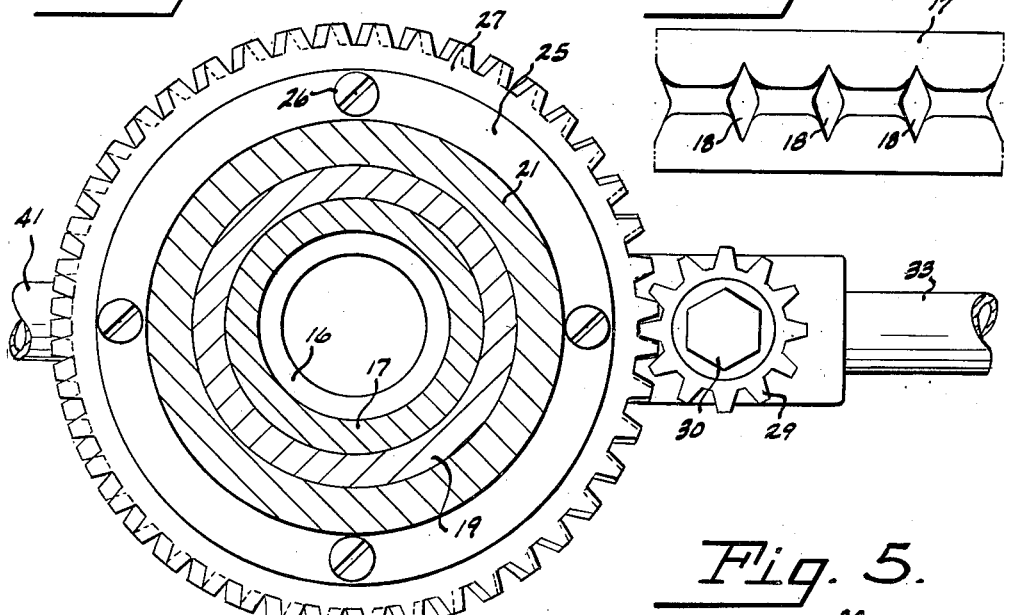
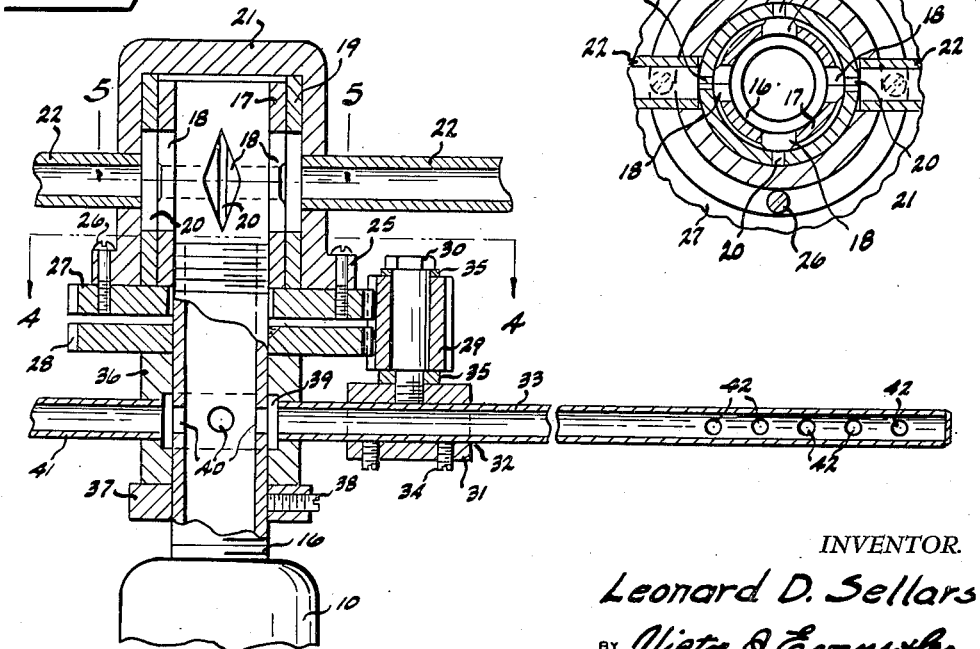
INVENTOR.
Leonard D. Sellars
BY Victor J. Evans & Co.
ATTORNEYS Patented Jan. 18, 1949

2,459,244

UNITED STATES PATENT OFFICE 2,459,244

SQUARE LAWN SPRINKLER

Leonard D. Sellars, Culver City, Calif.

Application October 30, 1946, Serial No. 706,551

3 Claims. (Cl. 299—18)

1

This invention relates to a rotary type of lawn sprinkler that is especially designed to distribute water evenly over a square shaped area.

An object of the invention is to provide a sprinkler that saves considerable water by not allowing it to be wasted on driveways, sidewalks or streets, as is the case when a conventional rotary circular sprinkler is used.

Another object of the invention is to provide a sprinkler that will prevent dry corners of the lawn that require subsequent hand watering for the proper irrigation thereof.

Another object of the invention is to provide a sprinkler that may be so located and regulated that it will irrigate the complete lawn including the four corners thereof without having to move it from one position to another.

A further object of the invention is to provide a sprinkler that can be made to distribute water over a rectangular lawn as well as a triangular lawn, as well as a square lawn if desired.

With the above and other objects and advantages in view, the invention consists of the novel details of construction, arrangement and combination of parts more fully hereinafter described, claimed and illustrated in the accompanying drawings in which:

Figure 1 is an elevational view partly in section of an embodiment of the invention;

Figure 2 is a plan view thereof;

Figure 3 is an enlarged detailed fragmentary sectional view of the operating mechanism of the device;

Figure 4 is a sectional view on the line 4—4 of Figure 3;

Figure 5 is a sectional view on the line 5—5 of Figure 3;

Figure 6 is a detailed fragmentary view of the water distribution means of the sprinkler and Figure 7 is a fragmentary detailed view partly in section of one of the watering pipes.

Referring more in detail to the drawings, the reference numeral 10 designates any suitable base which is provided with an inlet conduit 11 having a threaded end 12 adapted to receive the coupling 13 of a conventional garden hose 14.

The inlet conduit 11 communicates with a centrally located threaded bore 15 in which is threadably mounted in vertical relation to the base 10, a pipe or standard 16. Threadably connected to the upper end of the pipe 16 is the water distribution sleeve 17 which is provided in its walls in transverse relation thereto, the rhombical shaped ports 18 which are positioned for use on a square lawn at zero degrees, ninety degrees,

2 one hundred and eighty degrees and two hundred seventy degrees, with regard to the circumference of the sleeve. Variations of the positions of the ports will determine the shape of the area to be watered, as a rectangular lawn would have the ports positioned at zero degrees, sixty degrees, one hundred and eighty degrees and two hundred and forty degrees. Therefore the different areas to be watered are regulated by the position of the ports 18 in the sleeve 17.

Rotatably mounted on sleeve 17 is a second sleeve 19 which is provided with narrow elongated ports 20, which will coincide with ports 18 during the rotation of the revolving head 21 which is press fitted on the sleeve 19 after the ports 20 have been formed.

Mounted in the head 21 in diametrically opposed relation to each other, and in longitudinal alinement with each other and with the ports 20 in the sleeve 19 are the water distributing pipes 22 having the cup shaped nozzles 23 provided with the narrow slit 24 secured to the outer free ends thereof.

As the head 21 rotates and the ports 18 register with the ports 20, the amount of water distributed by the pipes 22 will be regulated to give a maximum amount at the corners and a lesser amount at the sides, thereby producing a square water distributing pattern.

The head 21, at its lower marginal edge, is provided with an annular right angularly extending flange 25 to which is secured by means of fasteners 26, the gear 27.

Secured to the pipe 16 in spaced parallel relation to gear 27 is gear 28. Gears 27 and 28 are of the same diameter and the teeth are of the same size except that by spacing the teeth on gear 28 slightly further apart than the teeth on gear 27, one tooth on gear 28 is eliminated; in other words, gear 28 has one less tooth than gear 27. However, the difference in spacing of the teeth on the gears 27 and 28 is so slight that gear 29 will mesh with both gears at the same time.

Gear 29 is rotatably mounted on the spindle 30, which is threadably mounted on block 31 in vertical relation thereto. Block 31 has a longitudinal bore 32 for the mounting thereof on pipe 33, and set screws 34 entering through the bottom of the block to engage the pipe 33 retain the block 31 in fixed relation to the pipe 33, with gears 27, 28 and 29 in meshing engagement with each other. Washers 35 on the spindle 30 at the top and bottom of the gear 29 permit free rotation of the gear.

Engaging the undersurface of the gear 28 and loosely mounted on pipe 16 is the sleeve or ring 36 which is retained in position by the collar 37 fixedly related to the pipe 16 by the nut screw 38. The sleeve 36 is provided with an inner annular groove 39 which communicates with the openings 40 in pipe 16. There are four openings, and each pair of openings is in diametrically opposed relation to each other. Thus water entering the pipe 16 will be discharged from the pipe through openings 40 into the annular groove 39 from whence it enters the diametrically opposed horizontally alined pipes 33 and 41 which are secured to the sleeve 36.

Water entering the pipes 33 and 41 causes the pipes to revolve around pipe 16 by discharge of the water through the relatively spaced apertures 42 adjacent the ends of pipes 33 and 41 on opposite sides thereof.

In operation with water pressure on, the pipes 33 and 41 revolve in the manner above described. With gear 29 mounted on pipe 33, this gear 29 will revolve about the gears 27 and 28. Thus gear 27 will be caused to rotate the amount of the tooth missing from gear 28 for each revolution of the sleeve 36. Thus the arms 22 will accommodate the outer edges and corners of a square shaped area, while the arms 33 and 41 will accommodate the central part of the square.

Thus a very slow motion of rotation of head 21 gives the best combination of alinement of the ports 18 and 20.

There has thus been provided a sprinkler which will adequately water square shaped areas, which by slight modification can be converted to water rectangular or triangular shaped areas and it is believed that the structure and operation of the sprinkler will be apparent to those skilled in the art.

It is also to be understood that changes in the minor details of construction, arrangement and combination of parts may be resorted to, provided they fall within the spirit of the invention and the scope of the appended claims.

Having thus described the invention, what is claimed as new and desired to be secured by letters patent is:

1. A device of the character described, comprising a base, a water inlet for said base, a tubular standard mounted in said base and communicating with said inlet, a head rotatably mounted on the upper end of said standard, a sleeve secured to the inner walls of said head, a sleeve fixed to the upper end of said standard, having loose contact with the sleeve within said head, ports in said sleeves adapted to aline with each other during the rotation of said head, water distributing arms mounted in said head in horizontal alinement with each other, and in diametrically opposed relation to each other, a gear secured to said head surrounding said standard, a gear of the same size but having one tooth less than the gear on said head mounted on said standard below the gear on said head, in parallel relation therewith, a sleeve rotatably mounted on said standard below the gear secured thereto, water distributing arms secured to said sleeve and gear mounting means on one of said arms a gear rotatably mounted on said last means, said last mentioned gear adapted to mesh with said first mentioned gears to cause rotation of said first gear when water is distributed by said last mentioned arms.

2. The invention as in claim 1 wherein the ports in said sleeves are positioned in diametrically opposed relation to each other, and the ports in the sleeve fixed to the upper end of the standard are substantially rhombical in shape.

3. The invention as in claim 1 wherein the standard within the sleeve rotatably mounted thereon is ported, and said last mentioned sleeve is provided with an annular groove communicating with said ports and with the arms secured to said last mentioned sleeve.

LEONARD D. SELLARS.

REFERENCES CITED

The following references are of record in the file of this patent:

UNITED STATES PATENTS

| Number | Name | Date |
|---|---|---|
| 575,966 | Main | Jan. 26, 1897 |
| 928,386 | Johnson | July 20, 1909 |
| 1,618,537 | Kittinger | Feb. 22, 1927 |
| 2,110,112 | Rippey | Mar. 1, 1938 |

FOREIGN PATENTS

| Number | Country | Date |
|---|---|---|
| 556,168 | France | Apr. 9, 1923 |